G. A. MERKT.
RAIL BONDING.
APPLICATION FILED FEB. 15, 1917.

1,308,637.

Patented July 1, 1919.

Gustav A. Merkt INVENTOR

BY Anthony Minia ATTORNEY

UNITED STATES PATENT OFFICE.

GUSTAV A. MERKT, OF WORCESTER, MASSACHUSETTS, ASSIGNOR TO AMERICAN STEEL & WIRE COMPANY OF NEW JERSEY, A CORPORATION OF NEW JERSEY.

RAIL-BONDING.

1,308,637.  Specification of Letters Patent.  Patented July 1, 1919.

Application filed February 15, 1917. Serial No. 148,705.

*To all whom it may concern:*

Be it known that I, GUSTAV A. MERKT, a citizen of the United States, residing in Worcester, Massachusetts, have invented certain new and useful Improvements in Rail-Bonding, of which the following is a specification.

My invention aims to provide improvements in the electric bonding of the ends of railroad rails and applies especially to the class of bonds which are effected by welding to the end portions of the steel rails, the opposite ends of a bond made of copper or bronze very high in copper content, which has a high electric conductivity compared with steel. In welding such a bond to a rail an oxy-acetylene blow-pipe or similar gas flame has been used to heat the rail, the bond terminal being clamped closely against the rail, and a copper wire has been melted in the flame and a molten mass thus formed and welded to the rail and to the terminal of the bond. In this operation various expedients have been resorted to to provide a space between the rail and the adjacent face of the bond terminal into which the flame could play so as to bring the steel up to the white heat necessary and to maintain it there and into which the melted copper would pass. But, as far as I am aware, it has not been possible to secure a good connection through the height of the vertical face of the bond terminal which is adjacent to the side of the rail head. On the contrary, these methods have resulted only in the building up of a mass of copper which unites with the top or upper portion of the rail bond terminal and with the side of the rail head but does not extend to any considerable extent down into the space between the bond terminal and the rail.

By my invention I succeed in securing a weld by means of an intermediate portion of copper which extends practically to the bottom of the vertical face of the bond terminal, and I do this by a very easy and quick operation. I thus produce a bonded structure consisting of the rail, the bond, and the intermediate portion of copper, which is much superior to previous bonds of the same class, in that there is a perfect electric connection throughout practically the entire area of the inner face of the bond terminal; which bond can be made cheaply and quickly and without the exercise of any extraordinary care or skill.

The method consists, generally speaking, in welding a coating or body of copper to the rail, and welding the end or terminal of the bond to said coating or body of copper.

The accompanying drawing illustrates a specific embodiment of the invention.

Referring to the specific embodiment of the invention illustrated, the rail head A, at a point near the end of the rail, is heated by a gas flame from a nozzle B, until the side of the rail is brought to a white heat. The operator then touches the white hot steel with the end of a copper wire C. The copper is quickly melted and sticks with a very strong weld to the steel. This operation is continued until an area equal to or slightly greater than that of the vertical face of the bond terminal is coated roughly with a coating or body D of copper. The copper wire is not held against the white hot steel long enough to melt so much copper that it will run down, being only touched against the steel until a small portion of the copper melts and sticks. It can be then transferred to an adjacent point so as to permit the copper thus stippled, as it were, on the steel to harden in place.

Figure 4:
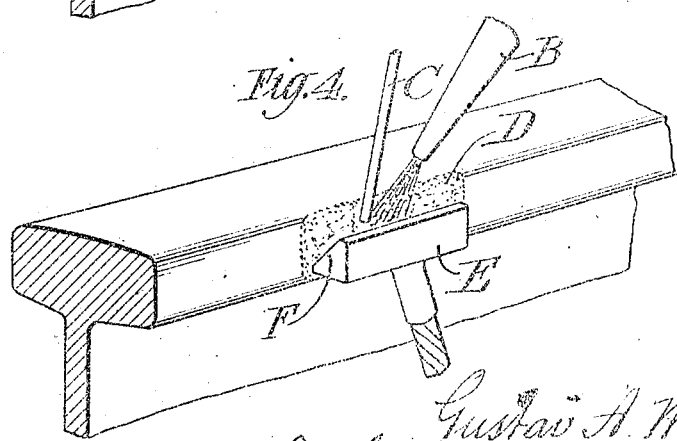

The next step is to bring the bond terminal E against the copper coated vertical side face of the rail, where it may be held by tongs or by any usual or suitable clamp, and to again use the blow-pipe to soften the coating D of copper and the adjacent face of the bond terminal. Fig. 4 illustrates this step. To increase the accessibility of the intermediate space to the gas flame the inner face of the bond terminal is inclined upwardly and outwardly throughout the greater portion of its height as indicated at F so as to form a sort of open-topped trough against the side of the rail. While the gas flame is played between the rail and the bond terminal, a copper wire C is introduced into the flame and melted and unites practically integrally with the molten or pasty copper faces of the bond terminal and the rail.

Where a similar operation has been attempted heretofore without previously coating the rail with copper, a practically insuperable difficulty has arisen because of the high temperature necessary to bring the steel to a welding heat and the fusibility of copper as compared with steel. It has been impossible to bring the steel, in the space directly opposed to the bond terminal, to a white heat without causing the copper to melt and run away. This difficulty due to the high temperature required by the steel is avoided in my method of applying copper thereto by the mode which I have described of applying the copper from the end of a wire which is only melted and applied little by little and progressively over the face of the steel. In the second operation (Fig. 4), the gas flame has only to heat two copper surfaces to welding temperature and it is not necessary to use such a temperature as would melt away the copper. Only the wire, held in the hottest part of the flame, will melt. The coating D of copper is so rough that there is not a close fit of the lower part of bond terminal against it. In fact the bond terminal may be so held as to only press against the copper coating after the latter is sufficiently softened to secure a welded connection. And if the terminal be pressed against the copper coating there is still sufficient space between them, due to the roughness described, to permit the flame to enter and soften the two adjacent faces so that they, together with the molten portions from the wire, will make a practically integral connection. And even if this connection does not run down absolutely to the lower edge of the bond terminal, nevertheless it will in all cases run nearly or practically thereto.

Figure 1:
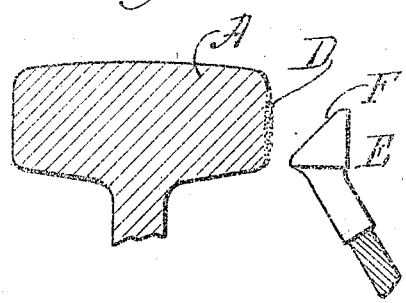
Figure 1 shows in section a rail head, with a bond terminal in elevation adjacent thereto.
Figure 2:
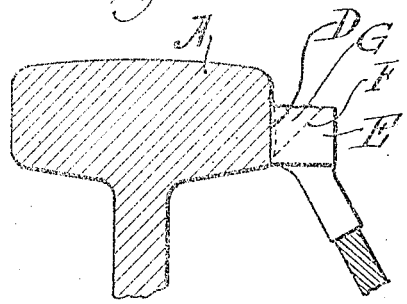
Fig. 2 illustrates the same parts united in accordance with the invention.
Figure 3:
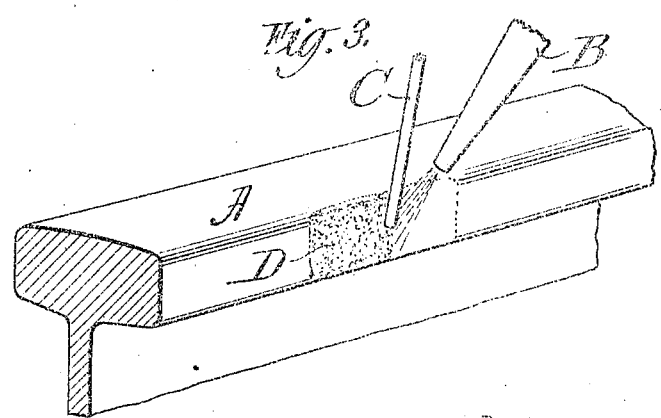
Figs. 3 and 4 illustrate in perspective successive steps of the process.

The resulting union is indicated more or less diagrammatically in Fig. 2, although it must be understood that the faces of the parts will be softened and changed somewhat in contour under the heat of the flame, and that the parts indicated are not separate bodies but practically one integral structure. First there is a coating or body D of copper welded to the vertical face of the rail head while the latter is at a plastic temperature. Alongside this face of the rail head is the terminal E of the bond, the inner face F of which is united integrally or at least welded, to an intermediate filling or body G of copper which in turn is similarly united or welded to the coating D on the side of the rail head.

With the ordinary heating flame operation, in which it has been attempted to weld a copper bond terminal directly to the steel rail the copper, or equivalent alloy has simply been fed to the top of the bond terminal and the side of the rail. It has been impossible to simultaneously reduce to plasticity the adjacent faces of the rail and the bond terminal clamped thereon. The steel melts or softens at a great deal higher temperature than the copper, and the greater heat diffusing properties in the shape and size of the rail than in the copper terminal add to the difficulty. Gas welded bonds have therefore consisted simply of a copper fillet built up above the terminal so as to prevent the melting away of the latter. Even when using a terminal with a sloped inner face, skilled oxy-acetylene welders know that it is impossible to reach the lower parts of the adjacent surfaces without melting off the copper terminal long before the adjacent steel surface is sufficiently hot to become plastic and to accept the copper. In consequence the operator merely conceals a poor joint beneath a good looking top surface, which is weak in strength and conductivity unless it is built up. In all joints of this sort which I have seen one could easily break the terminal away from the rail by putting a tool under the terminal and prying it up, and in most cases there is actually space thick enough to form a real air gap between the lower portion of the inner face of the bond terminal and the rail. A terminal applied in accordance with the present invention cannot be pried off except by such a force as would first break the intermediate portion of the bond.

Various modifications in the details of the process, the point of application to the rail, the shape of the bond terminal, and the shape and the location of the other parts of the complete structure may be made by those skilled in the art while still availing themselves of one or another of the features of the invention as expressed in the following claims.

Although the invention is illustrated in connection with a gas flame, there are other available means of heating the parts, such for example as electric arcs and other devices for securing a welding temperature; and I contemplate practising the invention with any usual or suitable method of heating.

What I claim is:

1. A method uniting a rail bond to a rail laid in a track which comprises applying a gas flame to a side face of a steel rail and thus heating it to a welding temperature, applying the end of a copper wire to the same while thus heated so as to melt and weld the copper on to the steel, continuing this operation over a suitable area of the rail face to form a rough coating of copper welded thereon, then placing adjacent to such copper coating a copper bond terminal the inner face of which is inclined upwardly and outwardly to form a trough, applying a gas flame to the inner adjacent faces of the coating and the bond terminal and thus heating them to a welding temperature lower than that to which the rail was first heated, melting the end of a copper wire in said flame so that the molten copper enters between and unites with the aforesaid adjacent faces throughout practically the entire height of the inner face of the bond terminal.

2. A method uniting a rail bond to a rail laid in a track which comprises applying a gas flame to a side face of a steel rail and thus heating it to a welding temperature, welding a body of copper thereon, then placing a copper bond terminal adjacent to such body, applying a gas flame to the adjacent faces of said body and said terminal, and thus heating them to a welding temperature, and introducing molten copper between said adjacent faces.

3. A method uniting a rail bond to a rail laid in a track which comprises applying a gas flame to a side face of a steel rail and thus heating it to a welding temperature, applying the end of a copper wire to the same while thus heated so as to melt and weld the copper on to the steel, continuing this operation over a suitable area of the rail face to form a rough coating of copper welded thereon, and then applying a copper rail bond to said copper coating.

4. A method uniting a rail bond to a rail laid in a track which comprises heating a portion of a steel rail to a welding temperature, applying the end of a copper wire to the same while thus heated so as to melt and weld the copper onto the steel, continuing this operation over a suitable area of the rail face to form a coating of copper welded thereon, and then applying a copper bond to said copper coating.

5. A method uniting a rail bond to a rail laid in a track which comprises heating a portion of a steel rail to a welding temperature, welding a body of copper thereon and then applying a copper bond to said body of copper.

6. A method uniting a rail bond to a rail laid in a track which comprises first welding a body of copper to a rail and subsequently welding a copper bond to said body.

7. A method uniting a rail bond to a rail laid in a track which comprises first welding a body of copper to a rail and subsequently welding a copper bond to said body through an intermediate mass of copper.

8. A method uniting a rail bond to a rail laid in a track which comprises first welding a body of copper to a rail and subsequently placing a copper bond terminal adjacent to said body, heating the adjacent faces to a welding temperature and introducing a second body of copper between the first body and the terminal.

9. A method uniting a rail bond to a rail laid in a track which comprises first welding a body of copper to a rail and subsequently placing a copper bond terminal adjacent to said body, heating the adjacent faces to a welding temperature and introducing a second body of copper filling the space between said adjacent faces and welded thereto.

In witness whereof I have hereunto signed my name.

GUSTAV A. MERKT.